United States Patent

Allmacher, Jr.

[11] 4,401,208
[45] Aug. 30, 1983

[54] ACCUMULATING CONVEYOR SYSTEM

[76] Inventor: Daniel S. Allmacher, Jr., 38531 Manchester, Mt. Clemens, Mich. 48043

[21] Appl. No.: 253,411

[22] Filed: Apr. 13, 1981

[51] Int. Cl.³ .............................................. B65G 13/06
[52] U.S. Cl. ..................................... 198/781; 464/34
[58] Field of Search .................. 198/781, 789; 464/34, 464/87

[56] References Cited

U.S. PATENT DOCUMENTS 4,143,525  3/1979  Major .................................. 198/781
4,275,572  6/1981  Holmes et al. ......................... 464/34

Primary Examiner—Jeffrey V. Nase
Assistant Examiner—Dennis Williamson
Attorney, Agent, or Firm—Neal A. Waldrop; Jay C. Taylor

[57] ABSTRACT

A torque limiting drive coupling adapted to rotate a conveyor roller of an accumulating conveyor system comprises inner and outer cylindrical driving and driven surfaces rotatable about a common axis and providing a space therebetween extending entirely around said axis, which space may have a constant radial dimension, or a radial dimension that decreases in both circumferential directions from a maximum to a minimum. A torque transmitting roller of resiliently deformable elastomeric material is initially compressed within said space to engage said cylindrical surfaces in rolling a frictional torque transmitting relationship. The maximum torque that can be applied to rotate the driven surface, which is connected with a conveyor roller for rotation in unison therewith, is a function of the force required to deform the roller upon rotation of the driving surface when rotation of the conveyor roller and the connected driven surface is stopped by operation of the conveyor system. Accordingly, when the conveyor roller is restrained against rotation, continued rotation of the driven surface will either impart a constant torque to the driven surface, or a torque that gradually increases to the maximum as the roller moves within said space to the region of minimum radial dimension, and momentary torque impulses of large magnitude tending to cause momentary rotational impulses to the conveyor roller and damage to the workpiece carried thereby are avoided.

18 Claims, 4 Drawing Figures

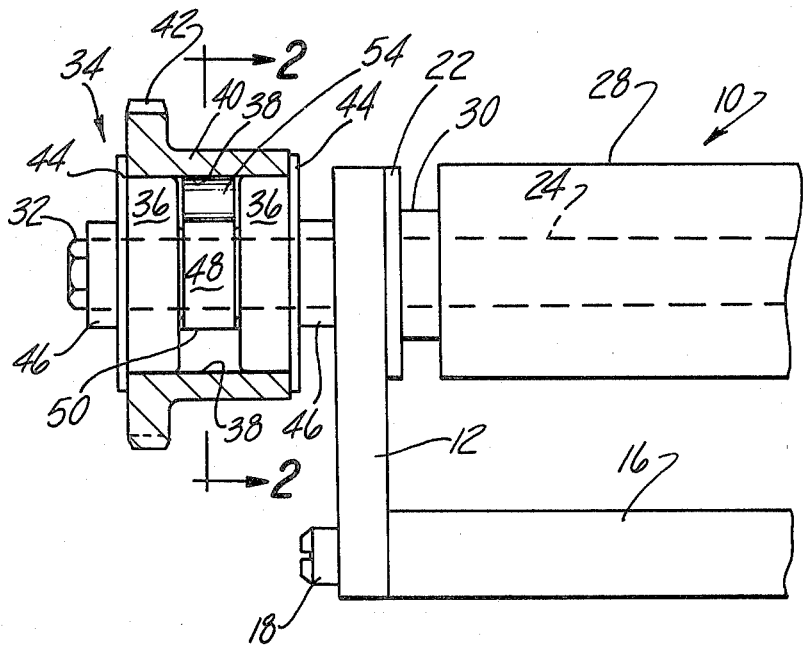
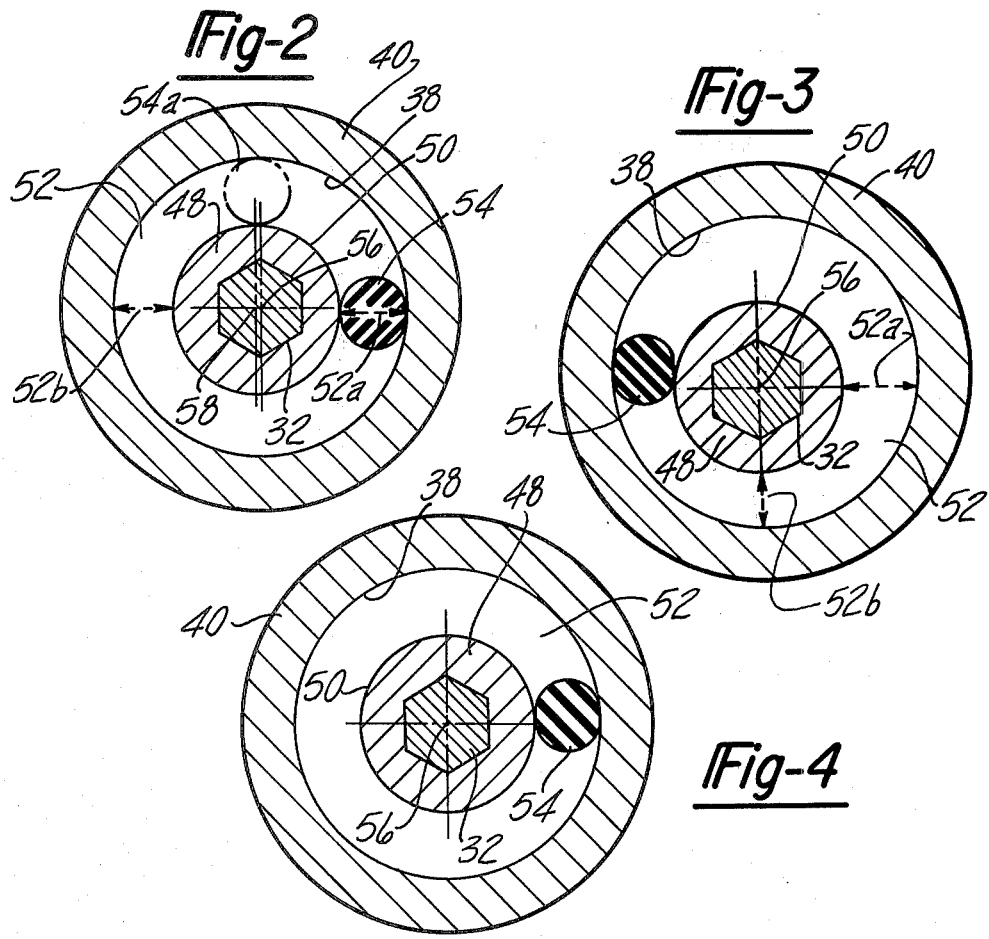

ACCUMULATING CONVEYOR SYSTEM

BACKGROUND AND OBJECTS OF THE INVENTION

This invention relates to a torque limiting coupling between a driving means, such as a power driven sprocket, and a driven means, such as a rotatable shaft keyed to one of a plurality of conveyor rollers in a continuously operative accumulating conveyor system. In such a system, a number of similar conveyor rollers rotatable about generally parallel side-by-side axes are provided for conveying articles or workpieces from one work station to another.

It is a commonplace to load the conveyor assembly with a number of the articles, which by way of example may comprise heavy automobile engine blocks, for conveyance to a work station where the articles or blocks are removed at intervals one at a time. In order to assure a continuous supply of engine blocks at the work station, a stop may be employed to engage the block and arrest the movement of the conveyor as each block in turn arrives at the work station. When each block at the work station is removed from the conveyor, the continuously operative conveyor moves the next successive block against the stop.

In a situation as described, it is desirable to provide continuous power to the driving means for the rollers, but to provide a torque limiting clutch or coupling between the driving means and each roller. Thus when a heavy engine block or other workpiece is waiting at the work station to be removed from the conveyor, the conveyor rollers underlying the block will cease rotation to prevent injury to the block or workpiece.

The prior art is replete with torque limiting couplings for use with roller conveyors as described, of which patents to Furlette et al, U.S. Pat. Nos. 4,056,953 and to Major, 4,143,525 are representative. Both show resiliently yieldable torque transmitting roller members between the cylindrical surface of a driving means and a driven shaft of polygonal cross section for imparting nominal driving torque to the shaft when the roller member engages a flat portion of the polygonal shaft and for enabling independent rotation of the driving means with respect to the driven shaft by resilient deformation of the roller member to override the apices of the polygonal shaft when the torque required to rotate the shaft exceeds a predetermined maximum.

A consequence of the prior art structures described is that a sharp pulsating torque is applied to the driven shaft when rotation of the conveyor roller keyed thereto is stopped, as for example when an engine block carried by the conveyor roller is stopped at the work station. Each time the resiliently yieldable torque transmitting member passes an apex portion of the driven shaft, the conveyor roller keyed to the shaft receives a momentary torque impulse, often causing a momentary rotation of the conveyor roller and damage to the overlying engine block of workpiece on the conveyor.

An important object of the present invention is to provide an improved, simple, and economical torque limiting coupling adapted for use with a continuously operative accumulating roller conveyor whereby pulsations in the driving torque applied to the conveyor roller are distributed over a comparatively large time interval or otherwise rendered sufficiently unobjectionable to avoid damage to parts carried by the conveyor roller when its rotation is stopped or impeded.

Other and more specific objects are to provide such a coupling comprising driving and driven means rotatable about a common axis, each means having a cylindrical surface, one within the other, dimensioned to provide a space between the cylindrical surfaces entirely around the axis of rotation. Although the cylindrical surfaces are generally circular in transverse section, they need not be true circles and may be slightly out-of-round cam surfaces to effect the desired shape of the aforesaid space as described herein. A torque transmitting member of resiliently yieldable elastomeric material is arranged within the space in frictional torque transmitting engagement with the two cylindrical surfaces to transmit driving torque to the cylindrical surface of the driven means from the cylindrical surface of the driving means upon rotation of the latter.

The torque transmitting member is preloaded to a resiliently deformed condition by means of an interference fit between the cylindrical surfaces, thereby to rotate the driven surface until its rotation requires a predetermined maximum allowable torque. When the torque required to rotate the driven means exceeds the maximum allowable torque, as for example when a conveyor roller rotated by the driven member is prevented from rotation by a heavy engine block thereon restrained against movement at a work station, the driving means will continue to rotate independently of the driven means. The latter will cease to rotate.

In one embodiment of the invention, the two cylindrical surfaces are arranged coaxially and are rotatable about their major common axis. As the torque required to rotate the driven means increases, relative movement between the torque transmitting member and at least one of the cylindrical surfaces may take place and gradually decelerate the rate of rotation of the driven means with respect to the driving means. In any event, at the maximum allowable torque, relative movement of at least one of the cylindrical surfaces with respect to the torque transmitting member will take place to enable continued rotation of the driving means independently of the driven means.

Although the undeformed shape of the torque transmitting member need not be cylindrical, and may be square in cross section or concavo-convex in order to conform to the cylindrical surfaces which it engages, a cylindrical roller type member rotatable about an axis parallel to the axis of rotation of the driving and driven members is preferred in order to minimize sliding contact and fractional wear. By virtue of the elastomeric resiliently yieldable torque transmitting roller and its interference fit between the cylindrical surfaces of the driving and driven means, the torque transmission may be primarily a function of the force required to deform the elastomeric roller. At the maximum allowable torque when rotation of the driven means ceases, the torque transmitting member or roller will move circumferentially within the annular space between the cylindrical surfaces of the driven and driving means upon continued rotation of the latter. In consequence, a constant maximum allowable torque will be applied to the driven means and torque pulsations which would otherwise be transmitted to the conveyor roller by the above-mentioned prior structures are entirely avoided.

In another embodiment of the invention, the major cylindrical axis of the driven means is arranged slightly eccentrically with respect to the common axis of rotation, i.e. the major axis of the cylindrical surface of the driving means. The space between the two cylindrical surfaces around the axis of rotation will thus have a radial dimension that decreases in both circumferential directions from a maximum radial dimension to a diametrically opposite minimum radial dimension. The operation of the resiliently yieldable torque transmitting member will be essentially the same as described above, except that as the torque required to rotate the driven means progressively increases to the maximum allowable torque, the torque transmitting member will be moved circumferentially from the maximum radial dimension and will be progressively compressed resiliently to increase the torque transmission gradually until the elastomeric member arrives at the location of minimum radial dimension to effect transmission of the maximum allowable torque.

If rotation of the conveyor roller is stopped, the increase in torque from the normal driving torque to the maximum allowable torque will be distributed over an appreciable time interval required for movement of the torque transmitting member from the region of the maximum radial dimension to the region of the minimum radial dimension. The application of sudden torque impulses to the conveyor roller and consequent momentary rotational movements or jerks thereof and damage to a workpiece carried thereon are thus avoided.

The above follows from the fact that the force required to deform a resiliently deformable member is inversely proportional to the time interval required for the deformation, neglecting friction. Other factors being equal in regard to the elasticity of the member, speed of rotation, etc., the slower and more gradual the torque build-up, the less will be the torque impulse transmitted to the conveyor roller.

In the Furlette et al construction, U.S. Pat. No. 4,056,953, where the apices of a hexagonal shaft are employed to deform the elastomeric torque transmitting roller, the attainment of maximum deformation is distributed over a 30° arc of the roller movement about the axis of the cylindrical driving surface, i.e. the arc of roller movement from the mid-point of one of the flat surfaces of the hexagonal shaft to the maximum deformation effected by the next adjacent apex. At the least, the maximum torque impulse applied to the hexagonal shaft will be approximately six times the maximum toque impulse effected by the present invention where the deformation is distributed over 180° of roller movement.

Actually the above analysis of the prior art understates the objections because for approximately half the 30° arc of deformation movement, the deformable roller moves along a flat surface of the hexagonal shaft. The major rapid deformation takes place in the remaining approximately one-half of the 30° arc of movement. The time duration for the maximuam deformation is thus appreciably less than the time required for the aforesaid 30° arc of rotation.

In addition, the above-noted prior art structures effect a comparatively sharp penetration by the shaft apex into a localized region of the resiliently deformable roller at the time of maximum allowable torque, whereby the useful life of the roller material is rapidly terminated by fatigue. In contrast, the present invention compresses a roller gradually between two smooth cylindrical surfaces. The effect of both the rapidity of the deformation and extent of localized deformation are minimized and the operating life of the deformable roller is appreciably lengthened.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a fragmentary elevation of a continuously operative accumulating conveyor roller system equipped with a torque limiting coupling of the present invention shown in partial radial section with the torque transmitting roller in an intermediate driving position.

FIG. 2 is a sectional view taken in the direction of the arrows substantially along the line 2—2 of FIG. 1, showing the coupling of FIG. 1 with the torque transmitting roller in the nominal torque driving position.

FIG. 3 is a view similar to FIG. 2, showing a modification with the torque transmitting roller in the maximum torque driving position.

FIG. 4 is a view similar to FIG. 2, showing another modification.

It is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation.

DETAILED DESCRIPTION OF THE PREFERRED EMBODIMENT

Referring to the drawings, an accumulating conveyor roller unit indicated generally by the number 10 comprises a pair of axially spaced supports 12, only one being shown, secured to a base 16 by a bolts 18. Mounted in the upper ends of the supports 12 are anti-friction bearings 22 supporting a rotatable driven shaft 24. Mounted on and keyed to the shaft 24 for rotation as a unit therewith is a hollow conveyor roller 28 having integral hubs 30 at its axially opposite ends. The shaft 24 may be hexagonal in cross section and extends through mating and correspondngly shaped openings in the hubs 30 for connecting the latter and roller 28 for rotation as a unit coaxially with the shaft 24. An integral outer coaxial hexagonal end portion 32 of the shaft 24 projects leftward in FIG. 1 from the bearing 22.

Mounted on the shaft end portion 32 is a torque limiting drive coupling indicated generally by the numeral 34, which includes a pair of axially spaced anti-friction bearings 36 supported coaxially on the shaft end portion 32. The inner cylindrical driving surface 38 of a tubular hub 40 of a drive sprocket 42 is journalled on the bearings 36. The sprocket 42 may be driven conventionally by power means, such as a sprocket chain not shown. A pair of end cover plates 44 supported on the shaft end 32 enclose the axial ends of the assembly 34 and are secured in place by retainers 46 suitably secured to the end portion 32. Also mounted on the shaft end portion 32 for rotation as a unit therewith and closely spacing the bearings 36 is a driven member or cam 48 having an outer cylindrical driven surface 50 spaced from the cylindrical surface 38 to provide a generally circular space 52 entirely around the axis of rotation of the hub 40. A torque transmitting roller member 54 of resiliently deformable elastomeric material, as for example a length of a polyurethane or polyvinyl chloride tubing, having its major cylindrical axis parallel to the axis of rotation of the cylindrical surface 38 is confined within space 52.

As indicated in FIG. 2, the longitudinal axis 56 of the shaft 24 and its end portion 32 is also the axis of rotation of the hub 40 and is coaxial with the cylindrical surface 38. The major axis 58 of the cylindrical driven surface 50 is offset slightly from the axis 56 but is parallel thereto so that the space 52 has a region of maximum radial dimension 52a and a diametrically opposite region 52b of minimum radial dimension. Thus the radial dimension of the space 52 progressively decreases in both circumferential directions from the maximum radial dimension 52a toward the minimum radial dimension 52b.

The elastomeric roller 54 is cylindrical in its undeformed condition and is dimensioned to effect an interference fit between the surfaces 38 and 50 at the region 52a of maximum radial dimension. The roller 54 is thus preloaded and resiliently deformed when at the region 52a to effect a frictional torque transmitting engagement with the surfaces 38 and 50.

Upon rotation of the driving sprocket 42 under comparatively light torque, the cylindrical but eccentric driven cam surface 50 is likewise rotated about the axis 56 by virtue of the torque transmitted via member 54. In the event of an increase in the torque required to rotate surface 50, as for example when the conveyor roller 28 is required to convey a heavy engine block, rotation of the surface 38 about the axis 56 will cause the roller member 54 to roll in the same direction of rotation about the cylindrical driven surface 50 and progressively increase the resilient deformation of the member 54 as it moves circumferentially into the converging portions of the space 52. As the roller member 54 is progressively deformed within its elastic limits, the driving torque imparted to the cylindrical driven surface 50 of the cam 48 likewise progressively increases. The member 54 will eventually reach an equilibrium position as indicated by the dotted position 54a whereat the force required to effect additional deformation of the roller 54 balances the torque required to rotate the cam 48. At this position the driving and driven surfaces 38–50 will continue to rotate as a unit.

In the event that rotation of the conveyor roller 28 is stopped for any reason as aforesaid, rotation of the shaft 24 and cam 48 keyed thereto at 32, FIG. 2, will also stop. Roller 54 will then roll to the position 52b of minimum radial dimension upon continued rotation of the driving hub 40. As the member 54 rolls toward the location 52b, it will be progressively deformed resiliently to gradually increase the driving torque against the cam surface 50 until the maximum driving torque is achieved at the location 52b. Thereafter the roller 54 will continue to move circumferentially in the direction of increasing radial dimension for the space 52 and will gradually return resiliently toward its initial preloaded condition at the region 52a. Similar to the situation described above regarding the progressive and gradual increase in the driving torque as the roller 54 moves from the position 52a toward the position 52b, the driving torque will gradually decrease as the roller 54 rolls from the position 52b toward the position 52a. The aforesaid gradual decrease in the driving torque results because the deformation of the resilient roller gradually decreases as it moves into the radially enlarging portions of the space 52. Thus the roller maintains its frictional driving engagement with the surface 50.

It is apparent by virtue of the construction shown and described herein that the gradual build-up in the driving torque from a normal condition to the maximum allowable torque and the similar gradual decrease from the maximum allowable torque to a normal driving torque avoids the transmission of short duration high torque pulses to the conveyor roller 28 and thus minimizes any tendency of short duration rotational surges of the conveyor roller 28. The force required to deform the roller 54 is distributed over the comparatively large time interval required for the roller to move 180° from the position 52a to the position 52b. In contrast, if the maximum deformation of the roller 54 were to take place in a comparatively short arc of movement, say for example 60° of rotational movement or less about the axis 56, the force required to deform the roller 54 in the shorter time would be approximately three times as great or more and the corresponding torque impulse transmitted to the cam 50 and conveyor roller 28 would likewise be approximately three times as great or more.

As illustrated in FIG. 3, the driven surface 50 of cam 38 need not have the preferred circular section of FIG. 2. The surface 50 in FIG. 3 gradually and smoothly enlarges radially in both circumferential directions from the region 52a of maximum radial dimension for space 52 to the region 52b of minimum radial dimension. The latter region may be located at any desired arc of rotation from the region 52a, as for example 90° clockwise or 270° counterclockwise as illustrated in FIG. 3. Accordingly the radial dimension of space 52 will decrease radially in either circumferential direction from the region 52a, as described above in regard to FIG. 2. Also the driving and driven relationships will be essentially the same as described above in regard to FIG. 2, except that the gradual increase in driving torque to the maximum allowable will now be distributed over 90° or 270° of rotation of roller 54 from the position 52a, depending upon whether the driving rotation of surface 38 is clockwise or counterclockwise. Correspondingly, the decrease in the driving torque from the maximum allowable will be distributed respectively over 270° or 90° of such rotation.

In accordance with the modification illustrated in FIG. 4, the cylindrical surfaces 38 and 50 are coaxial with the axis 56 of rotation of the shaft 24. Accordingly the radial dimension of the space 52 around the axis 56 is uniform and the extent of resilient deformation of the torque transmitting roller 54 does not change as it moves within the space 52. In other respects the operation of the structure illustrated in FIG. 4 is the same as described above. The resistance of the prestressed roller 54 to deformation will effect the torque transmission from the driving surface 38 to the driven surface 50. During normal low torque operating conditions, the roller 54 will not move or rotate with respect to the surfaces 38 and 50. In the event the load on the conveyor roller 28 is increased, the roller 54 may roll around the surface 50, enabling the latter to rotate slower than the surface 38. In the event rotation of the roller 28 is stopped completely, the rotation of surface 50 will likewise stop and the roller 54 will merely rotate around the surface 50 upon continued rotation of the sprocket 42 and surface 38. The resulting torque transmitted to the surface 50 will be constant and no pulsating torque whatever will be transmitted to the conveyor roller 28. It is apparent in regard to any of the modifications described, by suitably predetermining the resilient characterstics such as the elasticity and stiffness of the elastomeric material of the roller 54 and the dimensions of its interference fit in the space 52, the normal driving torque and the maximum allowable torque transmitted to the driven shaft 24 can also be readily determined.

Although the structure described is preferred because of its simplicity, it should be realized that any one of the members 40, 48 and 54 can be the driving member, or the driven member, or the torque transmitting member. A crank arm type connection between the drive means 42, or the driven shaft 32 and the member 54 will enable use of the latter as the driving or driven means respectively. Likewise, any one or more of the members 40, 48 and 54 could comprise elastomeric material comparable to the abovedescribed material for roller member 54. If one or both of the members 40 or 48 is elastomeric, the member 54 could then be rigid or elastomeric.

I claim:

1. An accumulating conveyor system comprising conveyor roller means, continuously operative torque limiting means for transmitting torque to said roller means to rotate the same when the torque required to rotate the roller means is less than a predetermined maximum and for avoiding the transmission to said roller means of torque impulses greater than said predetermined maximum when the torque required to rotate the roller means exceeds said predetermined maximum comprising driving means having a cylindrical driving surface, driven means operatively connected with said roller means for rotating the same and having a cylindrical driven surface, said cylindrical driving and driven surfaces being arranged for rotation about a common axis with said cylindrical surfaces one within the other to provide a space therebetween extending around said axis and decreasing in opposite circumferential directions for at least approximately 90° about said axis from a maximum radial dimension to a minimum radial dimension, means within said space for rotating said driven means in response to rotation of said driving means when the torque required to rotate said roller means does not exceed said predetermined maximum and for enabling continuous independent rotation of said driving means with respect to said driven means when the last named torque exceeds said maximum comprising a resiliently yieldable torque transmitting member in frictional torque transmitting engagement with said surfaces, said member being dimensioned to effect a preloaded interference fit between said surfaces and being resiliently deformed by said fit for transmitting driving torque from said driving to said driven surface and being relatively movable with respect to at least one of said surfaces to enable said independent rotation of said driving means when said torque exceeds said predetermined maximum.

2. The combination according to claim 1, said torque transmitting member comprising a resiliently deformable roller having a surface of circular section prior to being resiliently deformed by said interference fit between said cylindrical surfaces, said surface of the deformable roller being in said frictional engagement with said cylindrical surfaces and also is rolling engagement therewith, and said roller being adapted to roll within said space entirely around said common axis when the torque required to rotate said driven means exceeds said predetermined maximum.

3. The combination according to claim 1, said space decreasing in said opposite circumferential directions from a single maximum radial dimension to a single minimum radial dimension.

4. The combination according to claim 1, said roller means comprising a load carrying cylindrical conveyor roller rotatable about its major cylindrical axis, the operative connection between said driven means and roller means comprising a driven shaft rotatable about a longitudinal axis coaxial with said common axis and said axis of said conveyor roller, both said conveyor roller and said driven means being connected with said shaft for rotation coaxially therewith.

5. The combination according to claim 1, said torque transmitting member comprising a resiliently deformable roller having a surface of circular section prior to being resiliently deformed by said interference fit between said cylindrical surfaces, said surface of the deformable roller being in said frictional engagement with said cylindrical surfaces and also in rolling engagement therewith, and said roller being adapted to roll within said space entirely around said common axis when the torque required to rotate said driven means exceeds said predetermined maximum.

6. The combination according to claim 1, said driven means having its cylindrical surface eccentric to said common axis to effect a radial dimension for said space that decreases in both circumferential directions from a maximum radial dimension to a diametrically opposite minimum radial dimension, said resiliently deformable member being urged within said space around said axis by rotation of said driving surface with respect to said driven surface and being progressively yieldable resiliently upon movement from said maximum radial dimension to said minimum radial dimension for progressively increasing said torque to said maximum when said member is at said minimum radial dimension.

7. The combination according to claim 8, the cylindrical surfaces of said driving and driven means being circular in transverse section.

8. The combination according to claim 6, said torque transmitting member comprising a resiliently deformable roller having a surface of circular section prior to being resiliently deformed by said interference fit between said cylindrical surfaces, said surface of the deformable roller being in said frictional engagement with said cylindrical surfaces and also in rolling engagement therewith to facilitate said independent rotation of said driving means.

9. The combination according to claim 8, the cylindrical surfaces of said driving and driven means being circular in transverse section.

10. The combination according to claim 9, said roller means comprising a load carrying cylindrical conveyor roller rotatable about its major cylindrical axis, the operative connection between said driven means and roller means comprising a driven shaft rotatable about a longitudinal axis coaxial with said common axis and said axis of said conveyor roller, both said conveyor roller and said driven means being connected with said shaft for rotation coaxially therewith.

11. A torque limiting drive coupling comprising driving means having a cylindrical driving surface and rotatable about the major axis of said cylindrical driving surface, driven coupling means rotatable about said axis, driven means connected to said coupling means for rotation as a unit therewith about said axis and having a cylindrical driven surface, said driving and driven surfaces being arranged one within the other to provide a space therebetween extending around said axis and decreasing in opposite circumferential directions for at least approximately 90° about said axis from a maximum radial dimension to a minimum radial dimension, means within said space for rotating said driven means in response to rotation of said driving means when the torque required to rotate said driven means does not exceed a predetermined maximum allowable torque and for enabling continued independent rotation of said driving means with respect to said driven means when said torque exceeds said maximum allowable torque comprising a resiliently yieldable torque transmitting member in frictional torque transmitting engagement with said surfaces, said member being dimensioned to effect a pre-loaded interference fit between said surfaces and being resiliently deformed by said fit for transmitting driving torque from said driving to said driven surface and being relatively movable with respect to at least one of said surfaces to enable said independent rotation of said driving means when said torque exceeds said predetermined maximum allowable torque.

12. The combination according to claim 11, said torque transmitting member comprising a roller having a surface of circular section prior to being resiliently deformed by said interference fit between said cylindrical surfaces, said surface of the roller being in said frictional engagement with said cylindrical surfaces and also in rolling engagement therewith to facilitate said independent rotation of said driving means.

13. The combination according to claim 12, a pair of bearing means spaced axially by said driven means and supported on said coupling, means the cylindrical surface of said driving means extending around the cylindrical surface of said driven means and being rotatably supported on said pair of bearing means.

14. The combination according to claim 13, the cylindrical surface of said driving means comprising an interior surface thereof journalled on said bearing means at locations spaced axially by said space between said cylindrical surfaces, and said roller comprising a cylindrical member of elastomeric material having an outer cylindrical surface in said frictional and rolling engagement with said driving and driven surfaces.

15. The combination according to claim 14, said driven means having its cylindrical surface eccentric to said axis to effect a radial dimension for said space that decreases in both circumferential directions from a maximum radial dimension to a diametrically opposite minimum radial dimension, said resiliently deformable roller being urged within said space around said axis by rotation of said driving surface with respect to said driven surface and being progressively yieldable resiliently upon movement from said maximum radial dimension to said minimum radial dimension for gradually increasing said torque to said maximum allowable torque when said member is at said minimum radial dimension.

16. The combination according to claim 11, said driven means having its cylindrical surface eccentric to said axis to effect a radial dimension for said space that decreases in both circumferential directions from a maximum radial dimension to a diametrically opposite minimum radial dimension, said resiliently deformable member being urged within said space around said axis by rotation of said driving surface with respect to said driven surface and being progressively yieldable resiliently upon movement from said maximum radial dimension to said minimum radial dimension for gradually increasing said torque to said maximum allowable torque when said member is at said minimum radial dimension.

17. The combination according to claim 16, said driving and driven cylindrical surfaces being circular in cross section transverse to said axis.

18. The combination according to claim 17, said torque transmitting member comprising a roller having a surface of circular section prior to being resiliently deformed by said interference fit between said cylindrical surfaces, said surface of the roller being in said frictional engagement with said cylindrical surfaces and also in rolling engagement therewith to facilitate said independent rotation of said driving means.

* * * * *